United States Patent
Froelicher et al.

(10) Patent No.: US 9,688,546 B2
(45) Date of Patent: Jun. 27, 2017

(54) ELECTRICAL CONNECTION FOR AN APPLIANCE WATER FILTER

(71) Applicant: General Electric Company, Schenectady, NY (US)

(72) Inventors: Stephen Bernard Froelicher, Shepherdsville, KY (US); Natarajan Venkatakrishnan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 387 days.

(21) Appl. No.: 14/487,123

(22) Filed: Sep. 16, 2014

(65) Prior Publication Data

US 2016/0075566 A1 Mar. 17, 2016

(51) Int. Cl.
| | |
|---|---|
| *B01D 35/30* | (2006.01) |
| *C02F 1/00* | (2006.01) |
| *C02F 103/02* | (2006.01) |

(52) U.S. Cl.
CPC .............. *C02F 1/003* (2013.01); *B01D 35/30* (2013.01); *C02F 2103/02* (2013.01); *C02F 2201/006* (2013.01); *C02F 2209/005* (2013.01); *C02F 2209/445* (2013.01); *C02F 2307/12* (2013.01)

(58) Field of Classification Search
CPC ..................................................... B01D 35/30
See application file for complete search history.

(56) References Cited

U.S. PATENT DOCUMENTS

| | | | |
|---|---|---|---|
| 8,242,893 B1* | 8/2012 | Lin ........................ | C02F 1/001 340/10.42 |
| 9,366,388 B2* | 6/2016 | Krause .................... | F17D 3/01 |
| 2006/0151364 A1 | 7/2006 | Hacker | |
| 2011/0303543 A1* | 12/2011 | Fritze ..................... | B01D 35/06 204/554 |
| 2012/0304679 A1* | 12/2012 | Krause .................. | F25D 23/126 62/275 |
| 2013/0099900 A1 | 4/2013 | Pulvermacher | |
| 2014/0223715 A1* | 8/2014 | Bippus .................... | B23P 19/04 29/407.01 |

FOREIGN PATENT DOCUMENTS

EP 2570166 A2 3/2013

* cited by examiner

*Primary Examiner* — Thomas M Lithgow
(74) *Attorney, Agent, or Firm* — Dority & Manning, P.A.

(57) ABSTRACT

A water filter assembly having one or more electrical connections with a removable filter cartridge is provided. The electrical connections can be used to provide power to, and/or communication with, one or more electrical components incorporated into the filter cartridge. Wire form contacts are used to provide the electrical connections. The wire form contacts can be incorporated into a variety of different water filter assembly configurations having a removable filter cartridge.

19 Claims, 14 Drawing Sheets

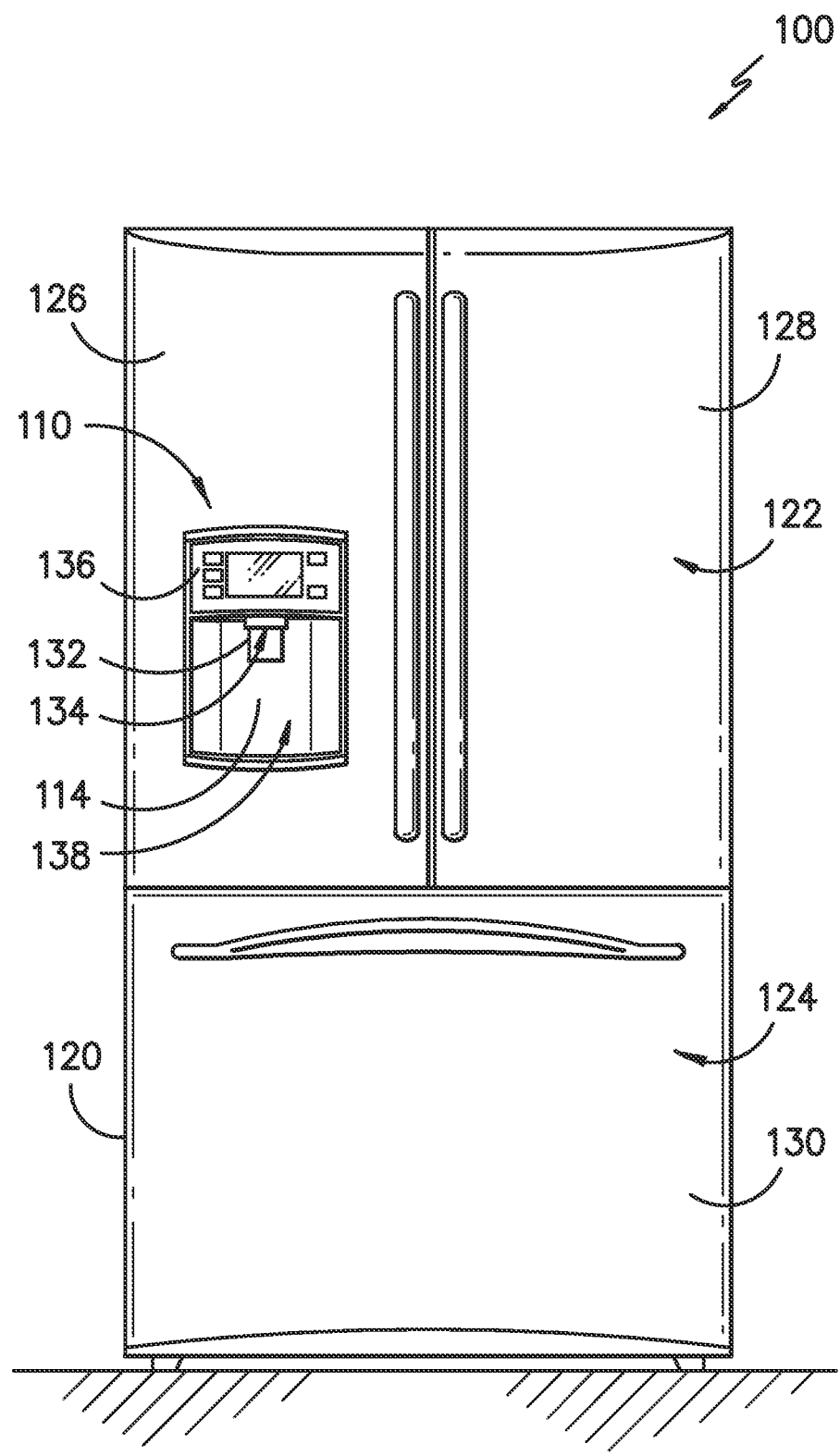
FIG. -1-

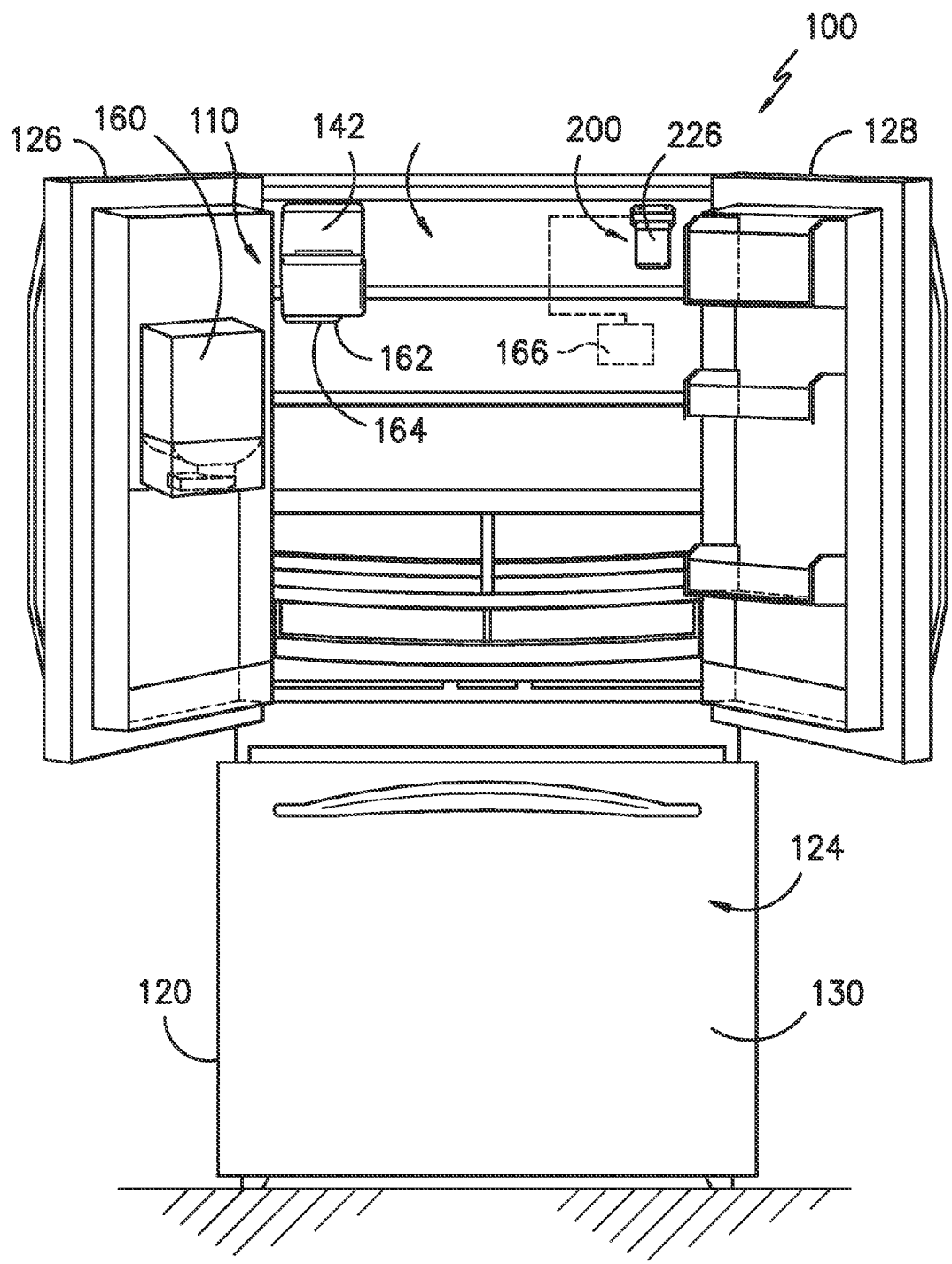
FIG. -2-

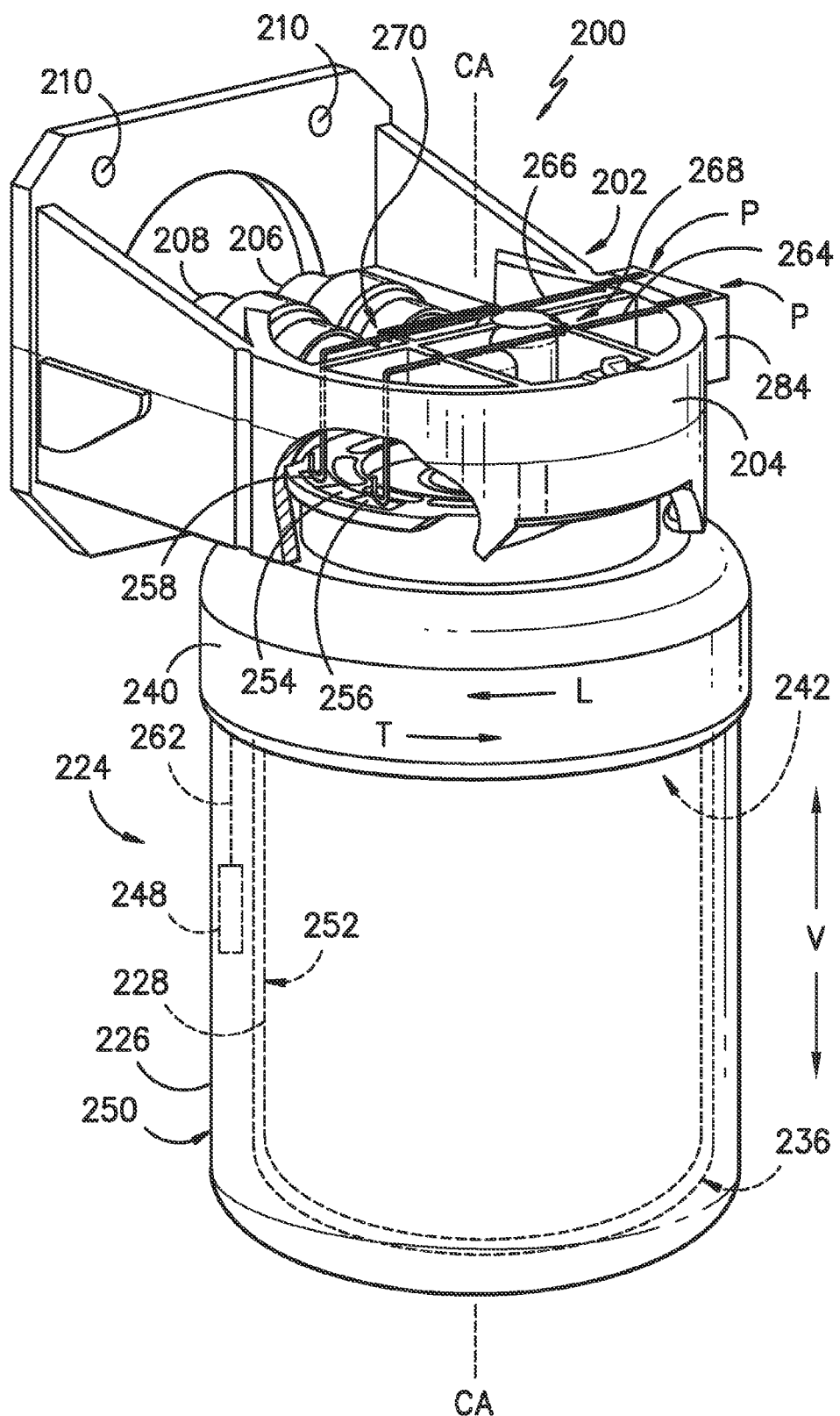
FIG. —3—

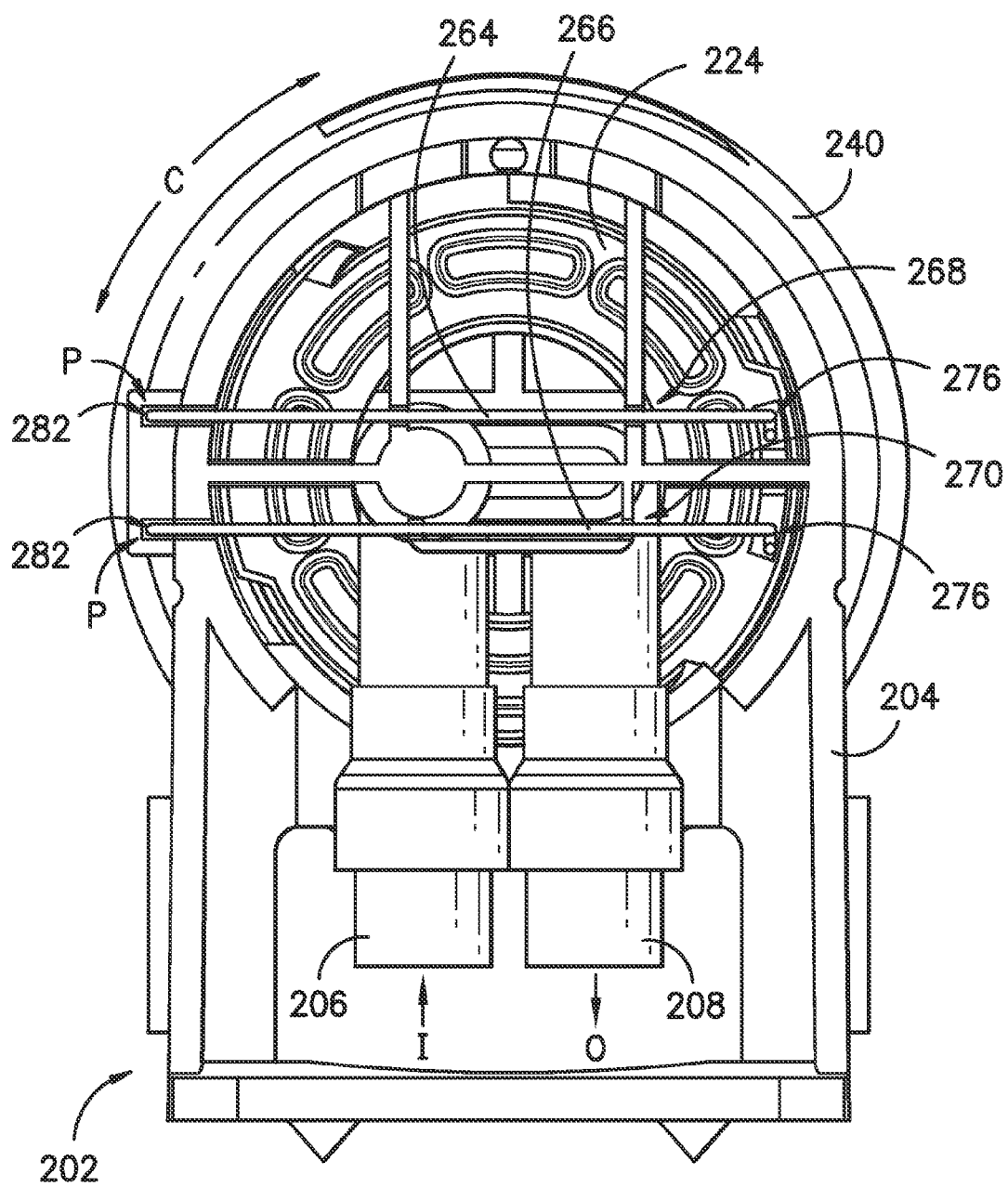
FIG. -4-

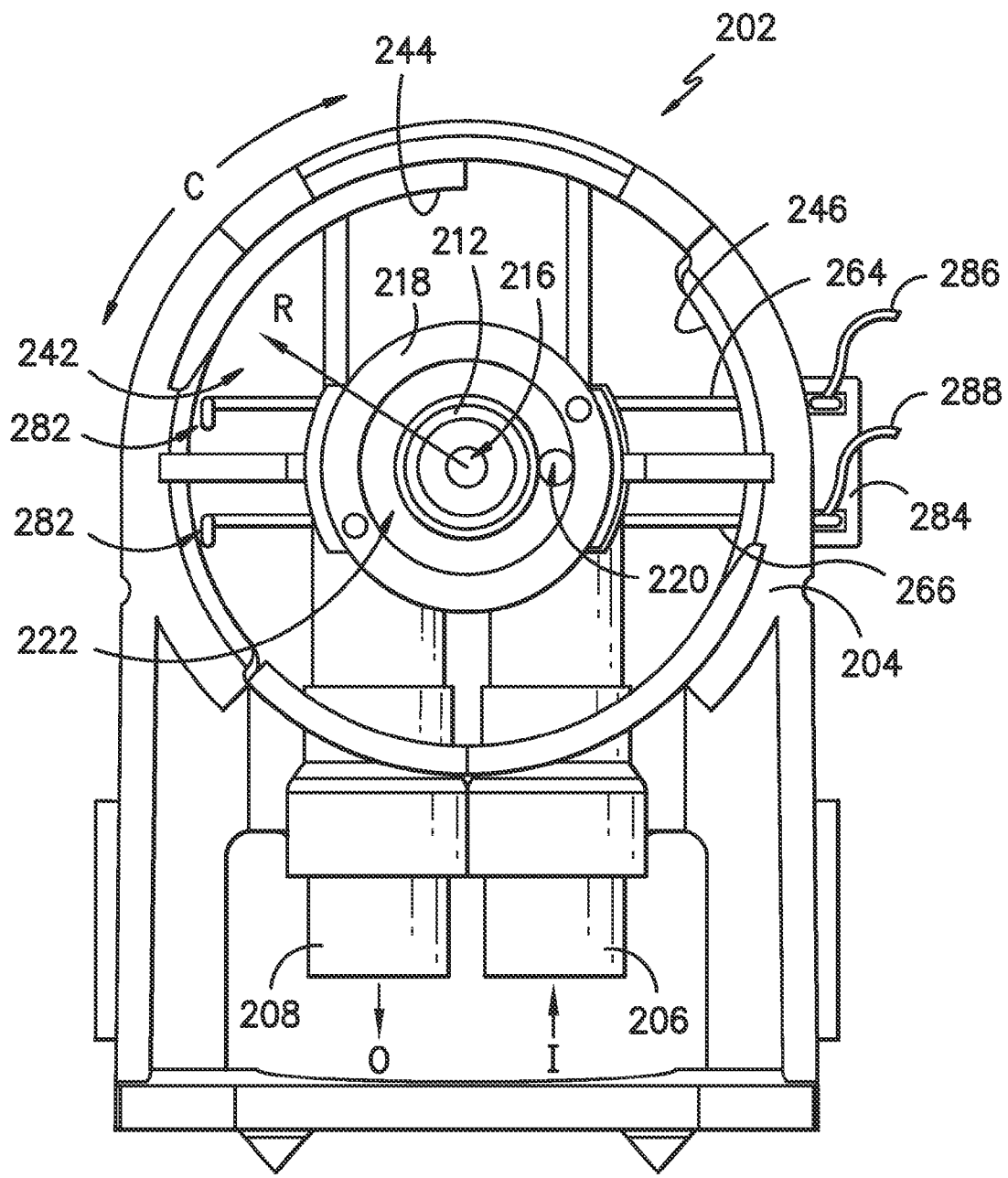
FIG. —5—

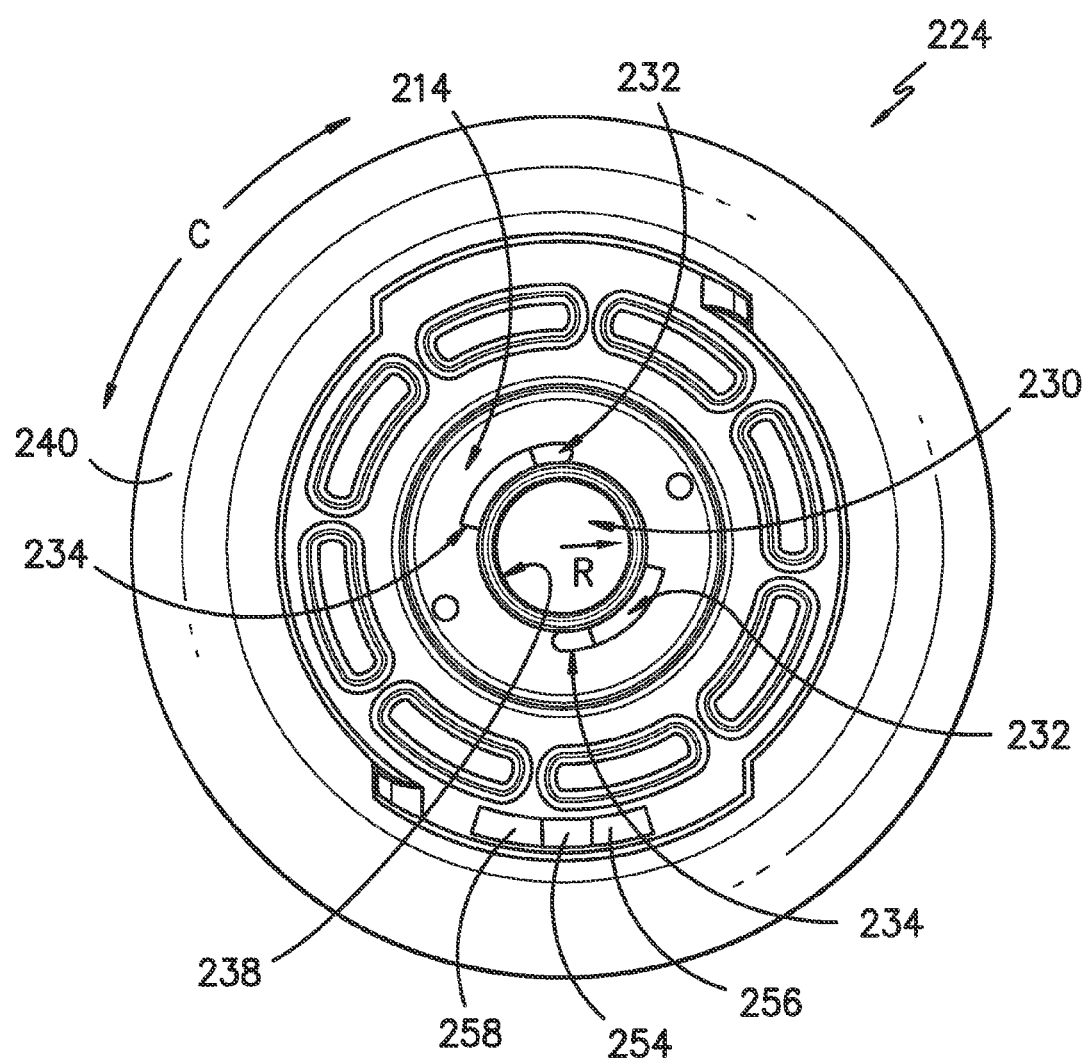
FIG. -6-

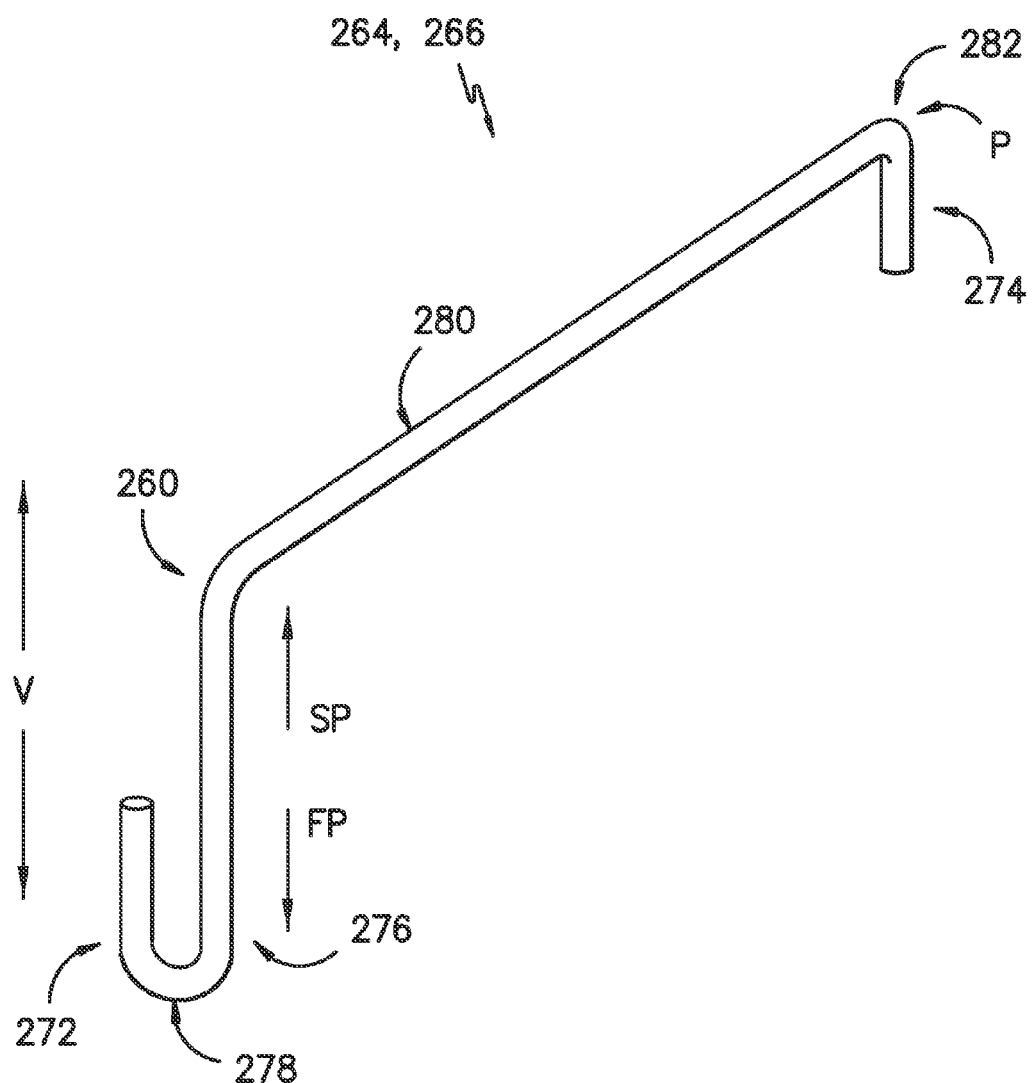
FIG. —7—

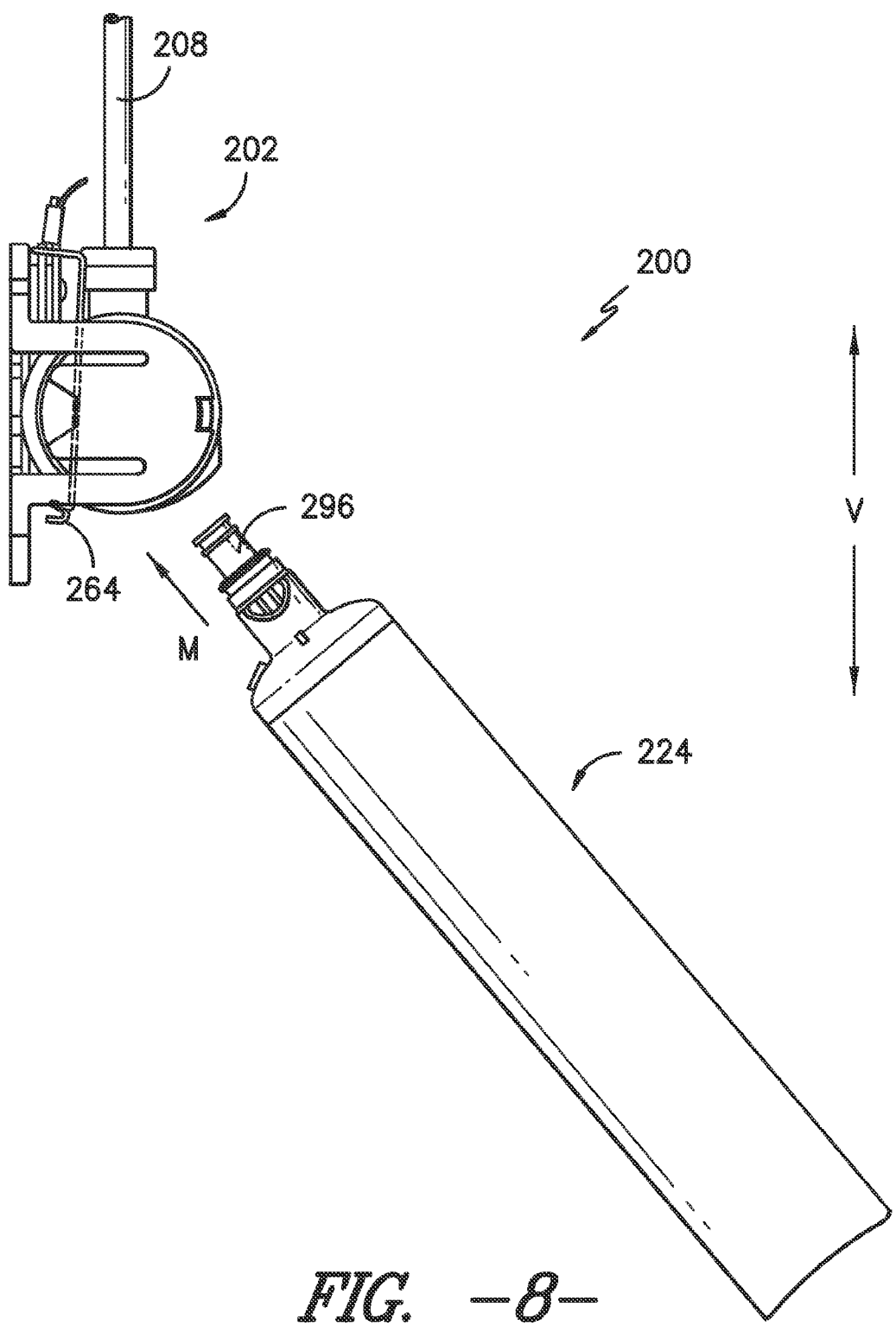
FIG. -8-

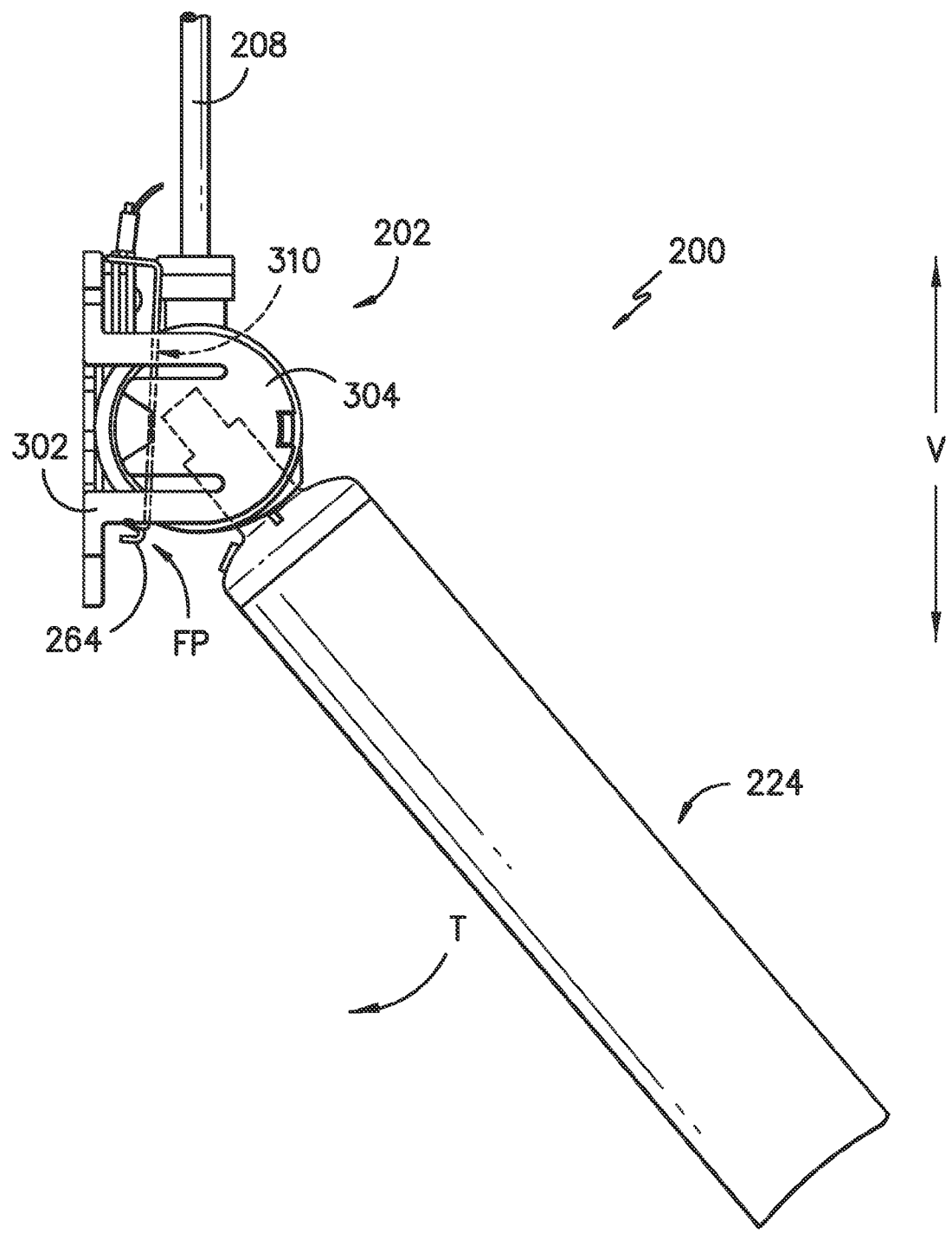
FIG. -9-

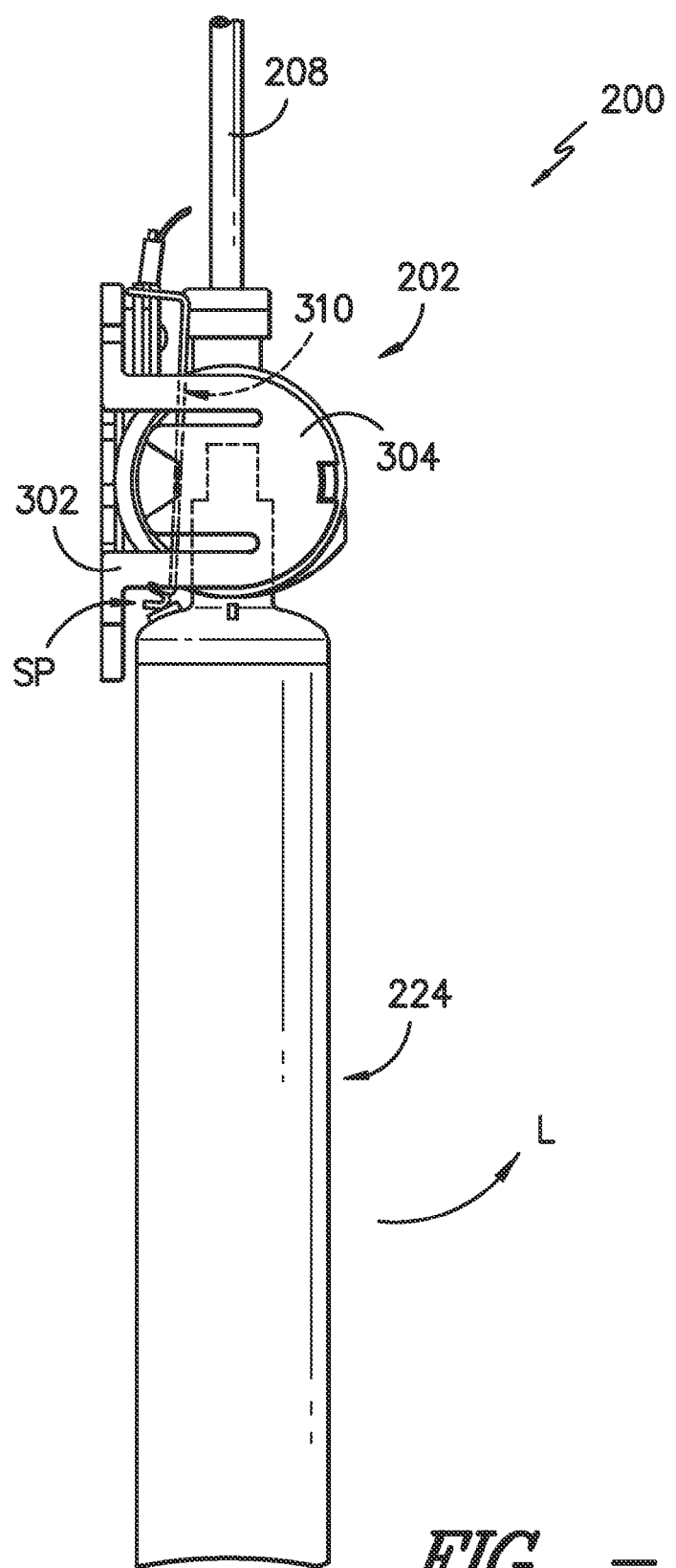
FIG. -10-

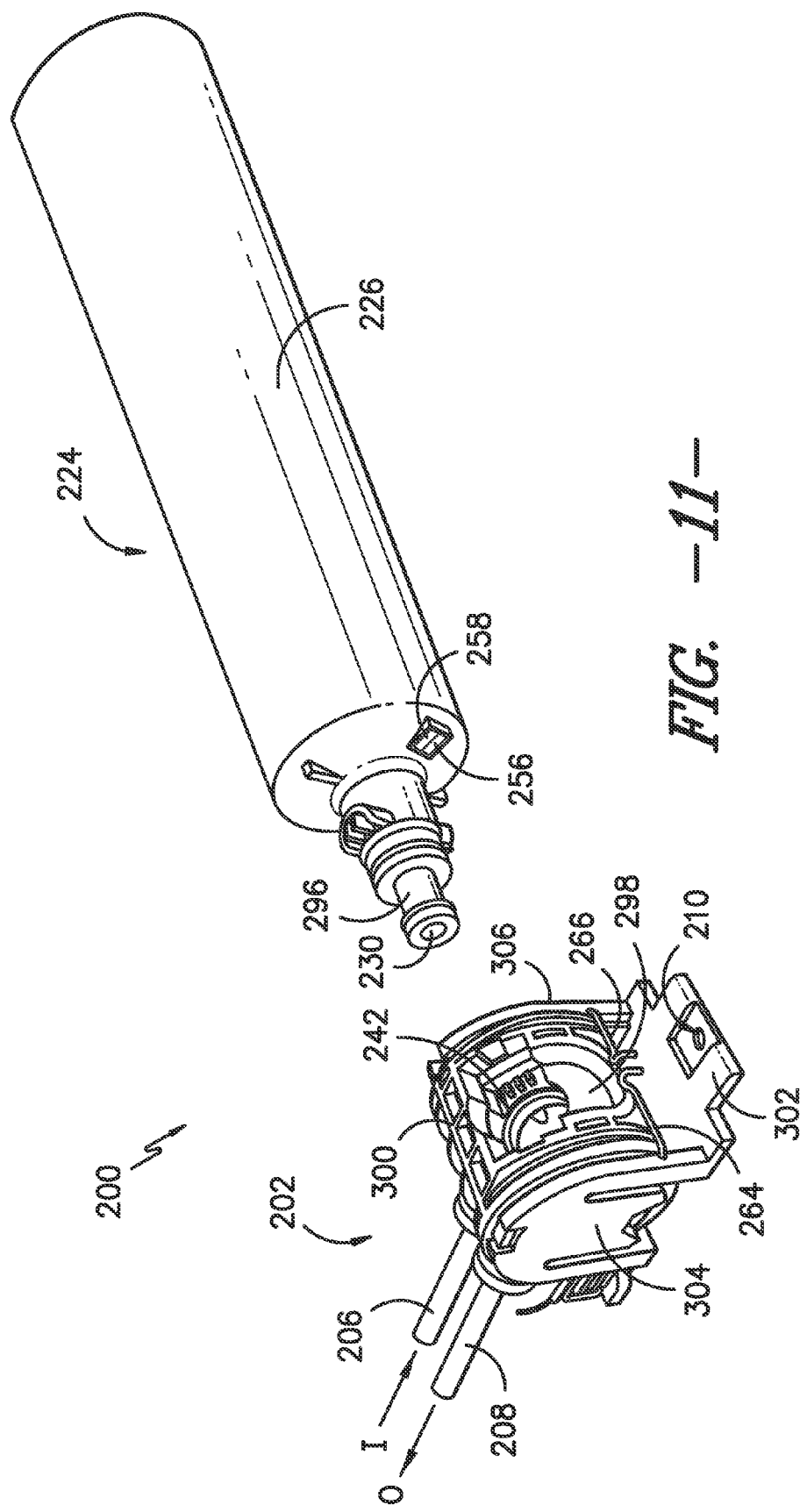
FIG. -11-

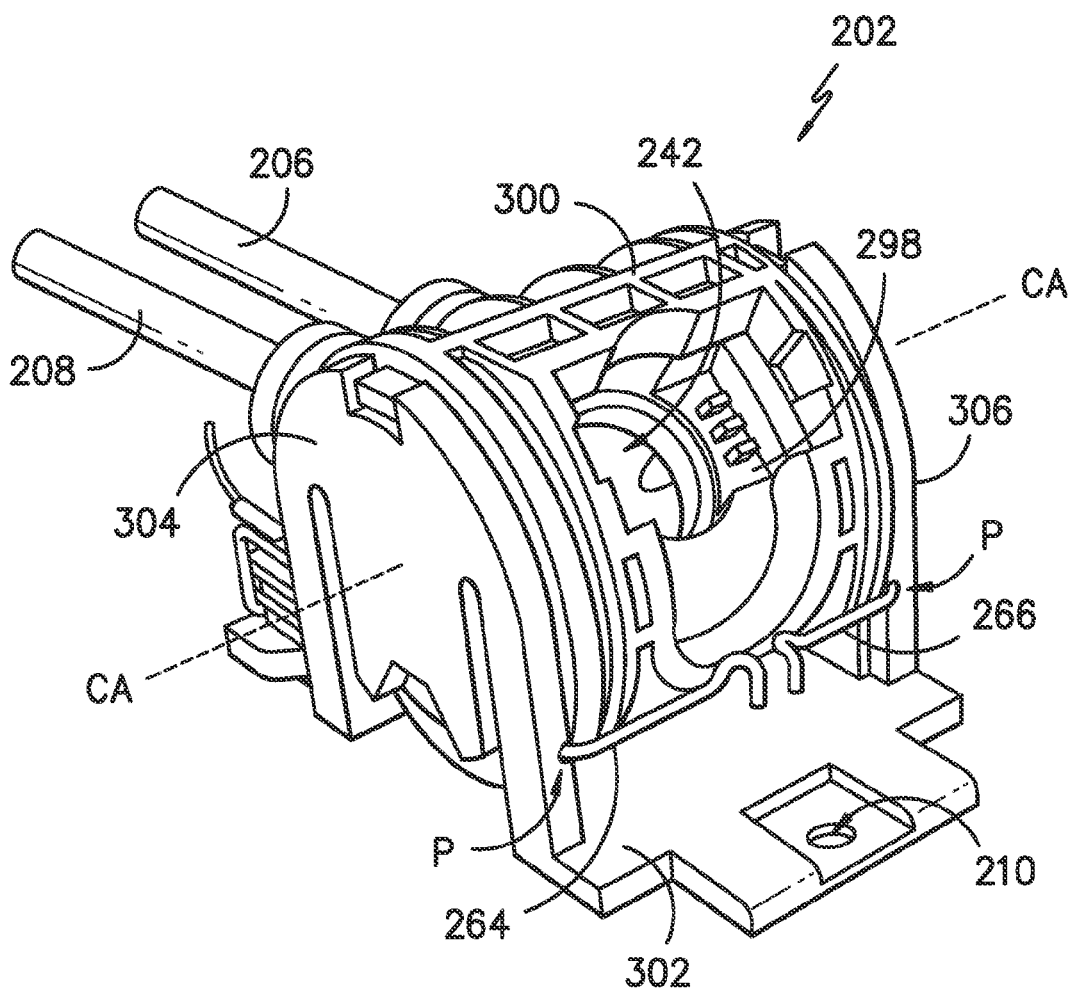
FIG. -12-

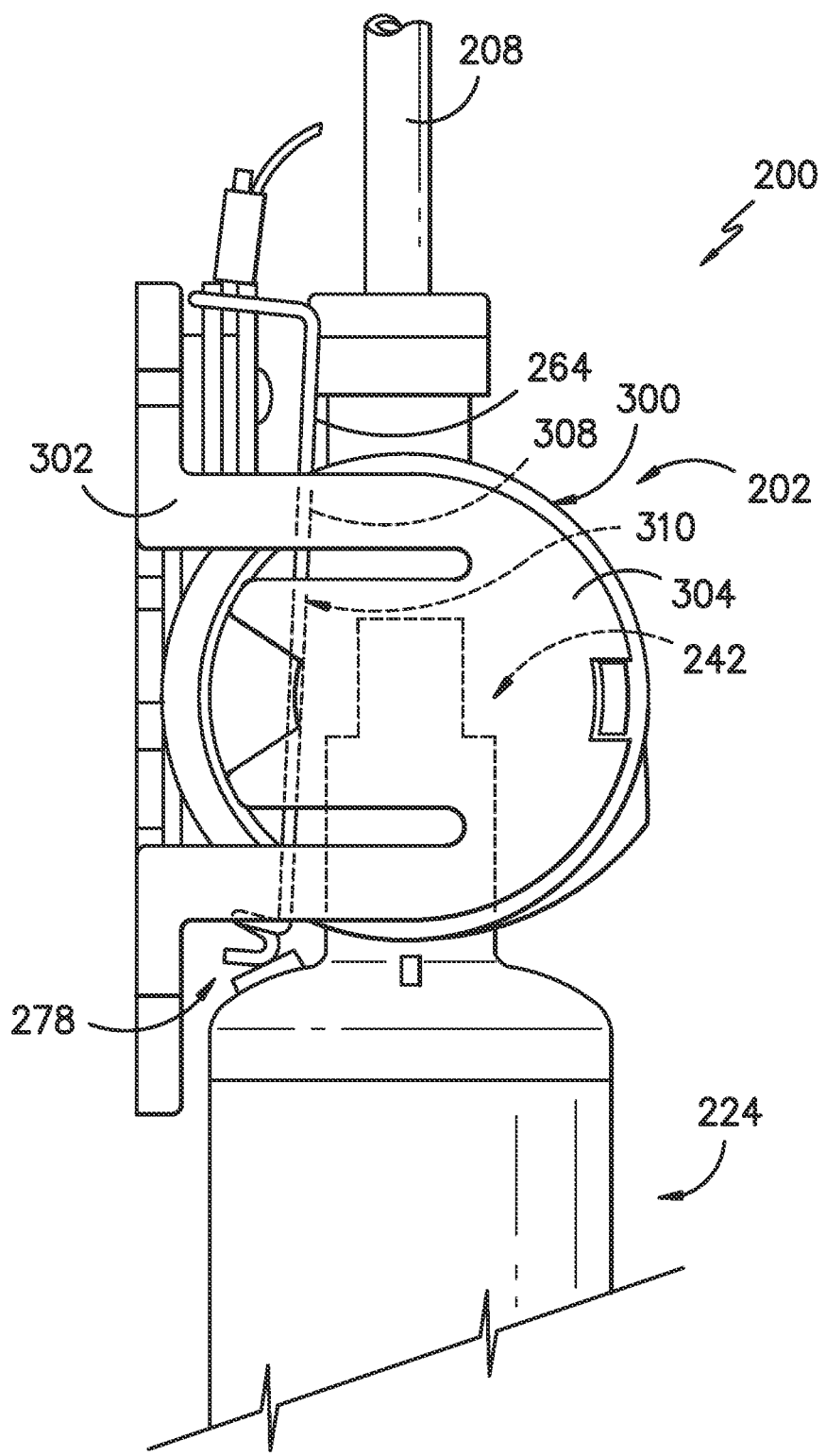
FIG. -13-

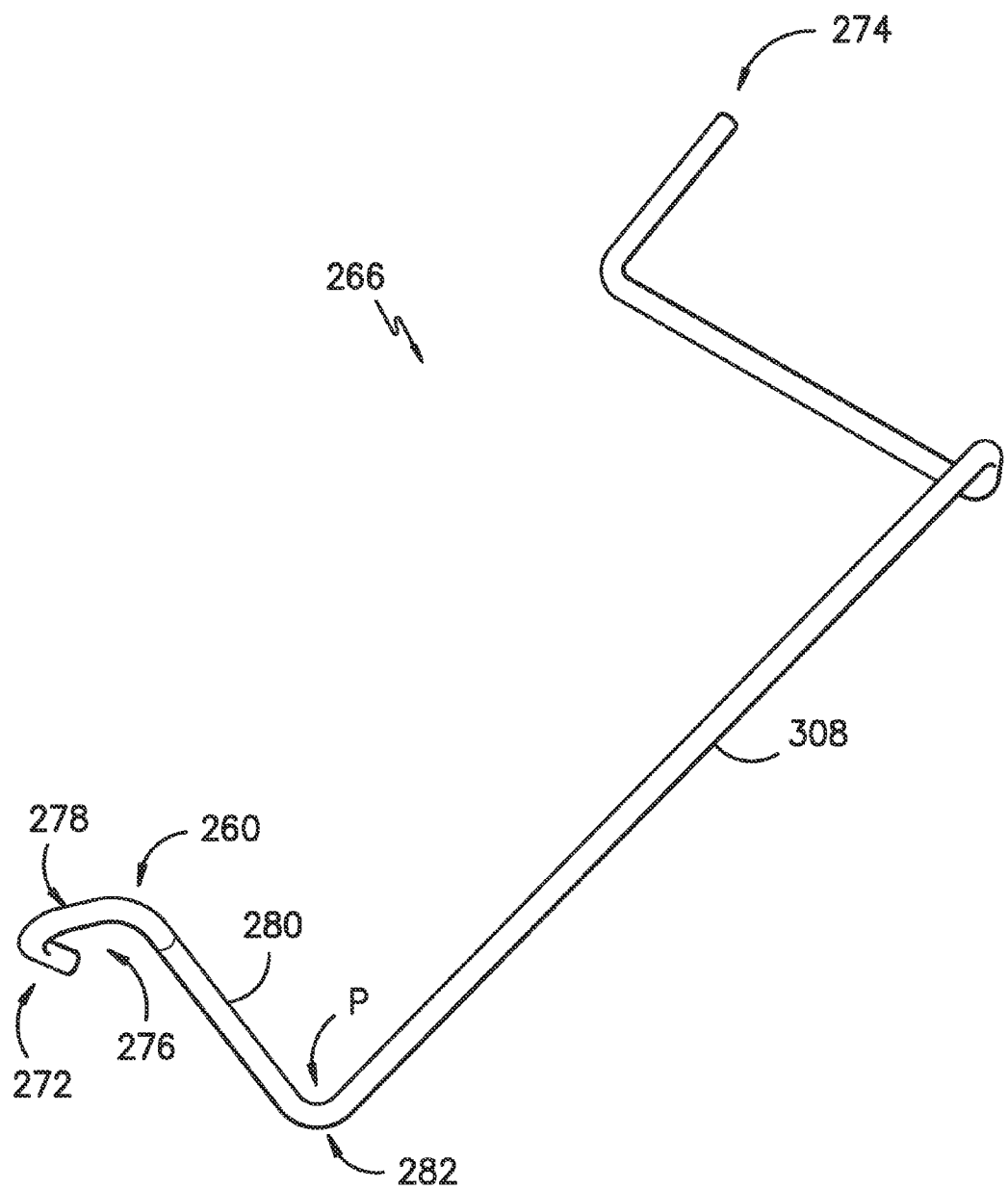
FIG. —14—

ELECTRICAL CONNECTION FOR AN APPLIANCE WATER FILTER

FIELD OF THE INVENTION

The subject matter of the present disclosure relates generally to a water filter for an appliance.

BACKGROUND OF THE INVENTION

Certain refrigerator appliances include water filter assemblies for filtering water. Water filter assemblies can filter water entering the refrigerator appliances in order to provide filtered water to various refrigerator appliance components, such as an ice maker and/or a water dispenser. Such filtering can improve a taste and/or an appearance of water within the refrigerator appliances.

Certain water filter assemblies include a manifold and a filter cartridge. The manifold is mounted to a cabinet of the refrigerator appliance and directs unfiltered water into the filter cartridge and filtered water out of the filter cartridge. The filter cartridge includes a filter media, such as an activated carbon block, a pleated polymer sheet, a spun cord material, or a melt blown material. The filter media is positioned within the filter cartridge and filters water passing therethrough.

The inclusion of one or more electronic components into a water filter assembly can be useful in providing various features and functionality. For example, the measurement of temperature, pressure, usage time, and other quantities can provide valuable information over the life of the filter. The inclusion of e.g., a radio frequency identification device or RFID can be useful for providing important information about the filter such as e.g., the manufacturer, model, date of manufacture, dates of use, and other information.

Over a period of use, a filter may eventually become clogged or otherwise depleted—requiring replacement. Accordingly, the water filter assembly may include a filter cartridge that is readily replaceable. For example, the filter may be provided in a cartridge that can be removed from a manifold and replaced with a new cartridge.

While providing useful features, the incorporation of such electronic components into a water filter assembly can present certain challenges—particularly in constructions where the filter cartridge is intended to be removable. More specifically, where electronic components are included in the filter cartridge, one or more electrical connections between the filter cartridge and other portions of the filter assembly such as e.g., the manifold, may be required to provide power, communication, or both, with the electronic components.

Accordingly, a water filter assembly for an appliance would be useful. More particularly, a water filter assembly having one or more electrical connections between a removable filter cartridge and a manifold or other portion of the filter assembly would be useful. Such electrical connections that can be incorporated readily into different filter assembly configurations would also be particularly beneficial.

BRIEF DESCRIPTION OF THE INVENTION

The present invention provides a water filter assembly having one or more electrical connections with a removable filter cartridge. The electrical connections can be used to provide power to, and/or communication with, one or more electrical components incorporated into the filter cartridge. Wire form contacts are used to provide the electrical connections. The wire form contacts can be incorporated into a variety of different water filter assembly configurations having a removable filter cartridge. Additional aspects and advantages of the invention will be set forth in part in the following description, or may be apparent from the description, or may be learned through practice of the invention.

In one exemplary embodiment, the present invention provides a water filter assembly. The assembly includes a manifold that defines an inlet for receiving unfiltered water and an outlet for directing filtered water out of the water filter assembly. The manifold defines a port. A filter cartridge is removably received into the port of the manifold. The cartridge includes a housing and a filtering media positioned therein for filtering a flow of water through the water filter assembly. The filter cartridge is rotatable between an installed position and an uninstalled position. A plurality of electrical contacts are positioned on the housing of the filter cartridge. A plurality of wire form contacts are received onto the manifold. The wire form contacts are movable between a first position when the filter cartridge is in the uninstalled position and a second position when the filter cartridge is in the installed position. In the second position the wire form contacts are in contact with the electrical contacts on the housing of the filter cartridge.

In another exemplary embodiment, the present invention provides a water filter assembly having a manifold that defines an inlet for receiving unfiltered water and an outlet for directing filtered water out of the water filter assembly, the manifold defining a port. A filter cartridge is removably received into the port of the manifold and includes a housing and a filtering media positioned therein for filtering a flow of water through the water filter assembly. The filter cartridge is rotatable between an installed position and an uninstalled position. A plurality of electrical contacts are positioned on the housing of the filter cartridge. A plurality of wire form contacts are received onto the manifold, wherein the wire form contacts each have a loop along one end that is depressed when the filter cartridge is in the installed position and released when the filter is in the uninstalled position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a front view of an exemplary refrigerator appliance as may be equipped with a water filter assembly of the present invention.

FIG. 2 provides a front view of the refrigerator appliance of FIG. 1 with the refrigerator doors in an open position.

FIG. 3 is a perspective view of an exemplary embodiment of a water filter assembly of the present invention with a portion of the manifold removed to more clearly reveal certain interior components.

FIG. 4 provides a top view of the exemplary water filter assembly of FIG. 3 with a filter cartridge installed.

FIG. 5 is a bottom view of the exemplary water filter assembly of FIG. 3 with a filter cartridge removed to more clearly reveal certain components of a filter manifold of the filter assembly.

FIG. 6 is a top view of the exemplary filter cartridge of FIG. 3.

FIG. 7 provides a perspective view of an exemplary embodiment of a wire form contact.

FIGS. 8, 9, and 10 provide side views of another exemplary embodiment of a water filter assembly of the present invention.

FIG. 11 provides an exploded view of the exemplary water filter assembly of FIGS. 8, 9, and 10.

FIG. 12 is a perspective view of an exemplary filter manifold.

FIG. 13 is a close up, partial side view of the exemplary water filter assembly of FIGS. 8, 9, and 10.

FIG. 14 provides another perspective view of an exemplary embodiment of a wire form contact.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front view of an exemplary embodiment of a refrigerator appliance 100 as may be equipped with an exemplary water filter assembly of the present invention. However, as will be understood using the teachings disclosed herein, the water filter assembly (including the filter cartridge) of the present invention may be used with other refrigerator appliance configurations as well as other types of appliances. It may also be used in applications other than appliances as well. For example, the filtering system of the present invention could be installed under a kitchen sink or as part of a whole housing filtration system. As such, refrigerator appliance 100 is provided only by way of example of an application of the exemplary water filtration system of the present invention.

Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In this exemplary embodiment, housing 120 also defines a mechanical compartment (not shown) for receipt of a sealed cooling system. Using the teachings disclosed herein, one of skill in the art will understand that the present invention can be used with other types of refrigerators (e.g., side-by-sides).

Refrigerator doors 126, 128 are rotatably hinged to an edge of housing 120 for accessing fresh food chamber 122. A freezer door 130 is arranged below refrigerator doors 126, 128 for accessing freezer chamber 124. In the exemplary embodiment, freezer door 130 is coupled to a freezer drawer (not shown) that is slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access fresh food chamber 122. In the exemplary embodiment, recessed portion 138 is positioned at a level that approximates the chest level of a user.

FIG. 2 is a perspective view of refrigerator appliance 100 having refrigerator doors 126, 128 in an open position to reveal the interior of the fresh food chamber 122. As such, certain components of dispensing assembly 110 are illustrated. Dispensing assembly 110 includes an insulated housing 142 mounted within chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. Insulated housing 142 contains an ice maker (not shown) for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As refrigerator door 126 is closed or opened, receptacle 160 is moved in and out of position under insulated housing 142.

Operation of the refrigerator appliance 100 is regulated by a controller 166 that is in communication with (or operatively coupled with) user interface panel 136 and/or activation member 132 (shown in FIG. 1). User interface panel 136 provides selections for user manipulation of the operation of refrigerator appliance 100 such as e.g., selections between whole or crushed ice, chilled water, and/or other options as well. In response to user manipulation of the user interface panel 136, controller 166 operates various components of the refrigerator appliance 100. Controller 166 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

Controller 166 may be positioned in a variety of locations throughout refrigerator appliance 100 in addition to the location shown in FIG. 2. For example, controller 166 may be located within or beneath the user interface panel 136 on refrigerator door 126. In such an embodiment, input/output ("I/O") signals may be routed between the controller and various operational components of refrigerator appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electro-mechanical input devices including rotary dials, push buttons, and touch pads. The user interface panel 136 may be in communication with the controller via one or more signal lines or shared communication busses.

Refrigerator appliance 100 also includes an exemplary water filter assembly or water filter assembly 200 that filters water coming into refrigerator appliance 100 from a water supply (not shown), such as a municipal water source or a well. Water filter assembly 200 can remove contaminants, such as chlorine, chloroform, lead, arsenic, pharmaceuticals, microbes, and/or other undesirable substances, from water supplied to refrigerator appliance 100. In particular, water filter assembly 200 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

For this exemplary embodiment, water filter assembly 200 is shown positioned within fresh food chamber 122. However, water filter assembly 200 may also be located e.g., on the exterior of refrigerator 100, on a surface adjacent to refrigerator 100, connected into a water supply line (not shown) providing water to refrigerator 100, and other locations as well. Also, as stated above, water filter assembly 200 could also be located under a sink, configured as part of a whole house filtration system, or otherwise configured for other applications as well.

Referring now to FIGS. 3, 4, 5, and 6, this exemplary embodiment of water filter assembly 200 includes a filter manifold 202 having a filter manifold body 204. A water inlet 206 and water outlet 208 are provided for a flow of unfiltered water into water filter assembly 200 (arrow I) and a flow of filtered water out of filter assembly 200 (arrow O), respectively. Water inlet 206 and water outlet 208 are adapted for coupling filter manifold 202 to a water supply system such as e.g., the piping system within a user's dwelling that may be connected with a well or municipal water supply. By way of example, water inlet 206 and water outlet 208 may be equipped with slip fittings, threads, fasteners, and/or other mechanisms for attachment. Apertures 210 allow for connection of filter assembly 200 to a wall, cabinet, or other surface. Other methods of attachment may also be used.

In this exemplary embodiment, filter manifold 202 includes a boss 212 that projects from filter manifold body 204 along an axial direction A. Boss 212 defines a water return port 216 that is in fluid connection with water outlet 208 whereby filtered water may be delivered from a filter cartridge 224 (FIG. 3) to water outlet 208. Boss 212 also defines a plurality of grooves (not shown) for the receipt of e.g., O-ring seals to ensure a fluid seal when boss 212 is received into filter cartridge 224 as will be further described. In other exemplary embodiments of the invention, boss 212 may be located on filter cartridge 224 and a receiving port provided in filter manifold 202 for receipt of boss 212. In still other embodiments of the invention, water filter assembly 200 may not include a boss as some other mechanism may be provided for connecting the flow of filtered water from cartridge 224 with filter manifold 202. Other configurations, including different shapes and connections, may be used for cartridge 224 and manifold 202 as well.

As shown in FIG. 5, a water delivery port 220 is also positioned proximate to boss 212. Water delivery port 220 is in fluid connection with water inlet 206 so as to provide unfiltered water into filter cartridge 224. For this exemplary embodiment, water delivery port 220 is positioned radially inward (see radial direction R) of an annular surface 218.

Filter manifold 202 also includes a groove 222 that extends circumferentially around boss 212. Water delivery port 220 is positioned within groove 222. When filter cartridge 224 is installed into filter manifold 202 as shown in FIG. 3, groove 222 is located adjacent to a receiving surface 214 (FIG. 6) on filter top 240 and provides for a flow of water from water delivery port 220 to be distributed over receiving surface 214 and into filter cartridge 224. As such, groove 222 is useful for preventing or minimizing clogs that may be caused by particulates or other matter in the unfiltered water provided through water inlet 206. Alternatively, or in addition thereto, a similar groove can also be located on receiving surface 214.

As shown in FIG. 3, for this exemplary embodiment, filter cartridge 224 includes a filter housing 226 defining a chamber 236 into which a filter media 228 is received. Filter element 228 may be constructed from a variety of different types of filter media including textiles, resins, webs, activated carbon, and other components as well. Filtration with filtering element 228 may be based upon e.g., size exclusion, adsorption, and/or other mechanisms. While a variety of different constructions may be used, filter media 228 may be cylindrically-shaped and configured so that water flows radially inward towards a center of filter media 228 as particulates or other matter are removed by the filter media.

Turning to FIG. 6, filter cartridge 224 includes a filter outlet 230 positioned along a centerline CA (FIG. 3) of filter cartridge 224 and defined by a filter top 240. Filter outlet 230 receives boss 212 of filter manifold 202 and provides a surface 238 for sealing with e.g., O-rings in grooves of boss 212. Once filter cartridge 224 is installed in filter manifold 202, water outlet 230 is fluidly connected (i.e. in fluid communication) with the water return port 216 defined by boss 212.

Continuing with FIG. 6, filter cartridge 224 also includes a filter inlet 232 in the form of multiple openings 234 in filter top 240 that are in fluid communication with water delivery port 220 when filter cartridge 224 is properly installed. Accordingly, unfiltered water from water delivery port 220 may be delivered into chamber 236 for filtration by filter media 228. Although only two openings 234 are shown, multiple openings may be provided having shapes and locations different from that shown.

As shown in FIGS. 3 and 5, filter cartridge 224 is received into a port 242 in filter manifold 202. Filter top 240 and filter manifold body 204 are provided with threads 244 and 246 (FIG. 5), respectively, for the removable connection of filter cartridge 224 to filter manifold 202. Threads 244 and 246 are provided by way of example only. Other mechanisms may be used for installation of filter cartridge 224. As indicated in FIG. 3, filter cartridge 224 is rotatable (arrows L and T)

about a central axis CA of the water filter assembly 200 between an installed position and an uninstalled position using threads 244 and 246.

Referring again to FIG. 3, as previously stated, water filter assembly 200 may be advantageously provided with certain features based on the incorporation of one or more electronic components. Where such electronic components are incorporated into filter cartridge 224, the present invention provides for electrically connecting to such components through filter manifold 202. For example, the present invention provides electrical connections in order to provide power to such electronic components and/or to provide communication between controller 166 and such components. In addition, the electrical connections of the present invention allow filter cartridge 224 to be replaced with another filter cartridge 224 while readily reestablishing electrical connections with the replacement cartridge.

By way of example, filter cartridge 224 can include a temperature sensor 248 that is configured to detect the temperature of the filter cartridge 224. More particularly, for this exemplary embodiment, temperature sensor 248 is embedded in the material used for the construction of filter housing 226. In alternative embodiments, temperature sensor 248 could be mounted on the exterior surface 250, interior surface 252, within or near filter media 228, or other locations in filter cartridge 224 where temperature measurement is desired. Temperature sensor 248 can provide intermittent or continuous temperature measurements to controller 166 during operation of water filter assembly 200. One or more leads 262 or other connections can be used to provide communication between first temperature sensor 248 and controller 166. Other types of sensors for different measurements (e.g., pressure) may be used as well. In still another embodiment, filter cartridge 224 may be equipped with an RFID 254 for purposes of e.g., providing an identification of the manufacturer, date of manufacture, period of use, model, or other information regarding the filter cartridge 224 and/or its use.

Referring now to FIG. 3 and FIG. 6, water filter assembly 200 includes a plurality of electrical contacts 256, 258 positioned on exterior surface 250 of filter housing 226. Although a pair of contacts 256, 258 are shown, it should be understood that 3 or more contacts may be used as well. For this exemplary embodiment, contacts 256, 258 are located adjacent to RFID 254—other configurations may be used as well. Contacts 256, 258 are constructed from an electrically conductive material such as a conductive metal. For this embodiment, each contact is formed as a thin sheet of conductive metal foil adhered to exterior surface 250. Each contact 256, 258 is electrically connected with one or more electrical components in filter cartridge 224 such as e.g., temperature sensor 248 and/or RFID 254. Contacts 256, 258 may directly connected to such electrical components and/or may be connected through one or more leads such as lead 262.

As shown in FIGS. 3, 4, and 5, water filter assembly 200 includes a plurality of wire form contacts 264 and 266 supported upon filter manifold 202. More particularly, filter manifold 202 defines a pair of grooves 268, 270 that position wire form contacts 264, 266 in a parallel manner on either side of central axis CA. Although a pair of wire form contacts 264, 266 are shown, it should be understood that 3 or more contacts may be used as well.

FIG. 7 provides a perspective view of wire form contacts 264, 266. Each wire form contact 264, 266 includes a first end 272 and a second end 274. First end 272 includes a loop 276 providing an arcuate contact surface 278 for providing physical and electrical contact with one of the electrical contacts 256, 258. An arm 280 extends between a first right angle bend 260 near loop 276 and a second right angle bend 282 near second end 274. As shown, arm 280 of each wire form contact 264, 266 is received into grooves 268, 270.

First end 272 is movable along the vertical direction V between a first position FP and a second position SP. Second ends 274 of each wire form contact 264, 266 is received into openings 290, 292 defined by a receptacle 284 (FIG. 5). The position of second ends 274 is fixed. Electrical connection between contacts 264, 266 and conductors 286, 288 is provided in receptacle 284, which is positioned along one side of filter manifold 202 as shown.

During installation or removal of filter cartridge 224, electrical contacts 256, 258 are readily connected and disconnected, respectively, from wire form contacts 264, 266. Specifically, during installation, filter cartridge 224 is positioned into port 242 of filter manifold 202. As filter cartridge 224 is rotated (arrow T in FIG. 3) from the uninstalled position to the installed position on threads 244, 246, filter cartridge 224 moves slightly towards filter manifold 202 along central axis CA. The resulting interaction of contacts 256, 258 with the loop 276 of each wire form contact 264, 266 depresses first end 272 slightly upwardly along vertical direction V from first position FP to second position SP. Each wire form contact 264, 266 is placed into tension as it slightly bends about a pivot point P at second right angle bend 282 to allow first end 272 to move between first position FP (when filter cartridge 224 is uninstalled) and second position SP (when filter cartridge 224 is installed). The slight tension provided by bending wire form contacts 264, 266 helps ensure physical contact and, therefore, electrical connection between electrical contacts 256, 258 and wire form contacts 264, 266 during filter operation.

Conversely, as filter cartridge 224 is rotated (arrow L in FIG. 3) between the installed position and uninstalled position, filter cartridge 224 is moved slightly away from filter manifold 202 along central axis CA. This movement disconnects contacts 256, 258 from wire form contacts 264, 266 and allows contacts 264, 266 to return to first position FP thereby releasing the tension created during installation.

Wire form contacts 264, 266 can be constructed from a variety of conductors. In one exemplary embodiment, conductors 264, 266 are constructed from steel and have a stiffness that helps maintain tension when filter cartridge 224 is installed.

The present invention is not limited to the water filter assembly shown in FIGS. 2 through 7. Instead, other water filter assemblies having different configurations and features may also be used. For example, FIGS. 8 through 14 depict another exemplary embodiment of a water filter assembly 200 in which a filter cartridge 224 is removably received into a port 242 of a filter manifold 202. A water inlet 206 and water outlet 208 provide for a supply of unfiltered and filtered water, respectively. Filter cartridge 224 contains filtering media as previously described for filtering a flow of water therethrough. Filter cartridge 224 includes a boss 296 defining a filter outlet 230 that is placed into fluid communication with outlet 208 when boss 296 is inserted (arrow M in FIG. 8) into port 242.

Referring specifically to FIGS. 11 and 12, in this exemplary embodiment, filter manifold 202 includes a rotatable cylinder 298 that is in fluid communication with inlet 206 and outlet 208. Rotatable cylinder 298 defines port 242 into which boss 296 is removably received. Filter manifold 202 also includes a housing 300 containing cylinder 298 while allowing the rotation of cylinder 298 about central axis CA.

Housing 300 is attached between a pair of arms 304, 306 of a mounting bracket 302. Aperture 210 provides for fixing bracket 302 to a surface.

Filter cartridge 224 is movable between an uninstalled position shown in FIG. 9 and an installed position shown in FIGS. 10 and 13. More particularly, once filter cartridge 224 is inserted into port 242, cartridge 224 can be moved in the direction of arrow T (FIG. 9), which rotates cylinder 298 about central axis CA (FIG. 12) and locks cartridge 224 into port 242. Conversely, for removal, filter cartridge 224 can be moved in the direction of arrow L (FIG. 10), which rotates cylinder 298 within housing 300 and about central axis CA as cartridge 224 moves into the uninstalled position and is unlocked from port 242.

As shown in FIG. 11, housing 226 of filter cartridge 224 includes a plurality of electrical contacts 256, 258 configured for providing electrical communication with one or more sensors, RFIDs, and/or other electrical components as previously described. FIGS. 9, 10, and 13 illustrate the interaction of electrical contacts 256, 258 and a plurality of wire form contacts 264, 266 when filter cartridge 224 is moved between the uninstalled position (FIG. 9) and the installed position (FIGS. 10 and 13).

FIG. 14 provides a perspective view of wire form contact 266—it being understood that wire form contact 264 has a similar construction albeit one that is symmetrical to contact 266. As shown, wire form contact 266 includes a first end 272 and a second end 274. First end 272 includes a loop 276 providing an arcuate contact surface 278 for providing physical contact and electrical connection with electrical contact 256. A first arm 280 extends between a first right angle bend 260 near loop 276 and a second right angle bend 282. A second arm 308, which is orthogonal to first arm 280, extends from second right angle bend 282. Second arm 308 is received into a groove 310 (FIGS. 10 and 13) formed in arm 304 of bracket 302. A similar configuration is used for wire form contact 266 having a second arm 308 located in a groove (not shown) provided by arm 306.

First end 272 of each wire form contact 264, 266 is movable between a first position FP (FIG. 9) and a second position SP (FIG. 10). During installation or removal of filter cartridge 224, electrical contacts 256, 258 are readily connected and disconnected, respectively, from wire form contacts 264, 266. Specifically, during installation, filter cartridge 224 is positioned into port 242 of filter manifold 202. As filter cartridge 224 is moved (arrow T in FIG. 9) from the uninstalled position to the installed position (FIG. 10), filter cartridge 224 rotates about central axis CA (FIG. 12) and moves towards filter bracket 302. This movement causes contacts 256, 258 to depress loops 276 of each wire form contact 264, 266 from first position FP to second position SP. Each wire form contact 264, 266 is placed into tension as it slightly bends about a pivot point P at second right angle bend 282 to allow first end 272 to move between first position FP (when filter cartridge 224 is uninstalled) and second position SP (when filter cartridge 224 is installed). The slight tension provided by bending wire form contacts 264, 266 helps ensure physical contact and, therefore, electrical connection between electrical contacts 256, 258 and wire form contacts 264, 266 during filter operation.

Conversely, as filter cartridge 224 is moved (arrow L in FIG. 10) between the installed position and uninstalled position, filter cartridge 224 rotates about central axis CA (FIG. 12) and moves away from filter bracket 302. This movement disconnects contacts 256, 258 from wire form contacts 264, 266 and allows contacts 264, 266 to return to first position FP—thereby releasing the tension created during installation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter assembly, comprising:
    a manifold that defines an inlet for receiving unfiltered water and an outlet for directing filtered water out of the water filter assembly, the manifold defining a port, the manifold comprising
        a rotatable cylinder in fluid communication with the inlet and outlet, the rotatable cylinder defining the port;
        a housing into which the rotatable cylinder is received, the cylinder rotatable within the housing between an installed position and an uninstalled position; and
        a mounting bracket having a pair of arms to which the housing is attached, the housing positioned between the pair of arms;
    a filter cartridge removably received into the port of the manifold, the filter cartridge comprising a housing and a filtering media positioned therein for filtering a flow of water through the water filter assembly, the filter cartridge rotatable between the installed position and the uninstalled position;
    a plurality of electrical contacts positioned on the housing of the filter cartridge; and
    a plurality of wire form contacts received onto the manifold, the wire form contacts movable between a first position when the filter cartridge is in the uninstalled position and a second position when the filter cartridge is in the installed position, wherein in the first position the wire form contacts are not in contact with the electrical contacts on the housing of the filter cartridge and in the second position the wire form contacts are in contact with the electrical contacts.

2. A water filter assembly as in claim 1, wherein in the second position the wire form contacts are depressed by the electrical contacts.

3. A water filter assembly as in claim 1, wherein in the second position the wire form contacts are slightly bent by the electrical contacts.

4. A water filter assembly as in claim 1, wherein each wire form contact comprises:
    a first end having a loop for contact with one of the electric contacts on the housing of the filter cartridge;
    a second end;
    a bend positioned between the first end and the second end; and
    an arm extending between the first end and the bend.

5. A water filter assembly as in claim 4, further comprising a receptacle positioned along a side of the manifold, the receptacle defining two openings in which the second ends of the wire form contacts are received.

6. A water filter assembly as in claim 5, wherein the filter cartridge rotates about a central axis of the water filter assembly between the installed position and the uninstalled position, and wherein the manifold defines grooves extending in a parallel manner over the manifold on opposing sides of the central axis and configured for receipt of the wire form contacts.

7. A water filter assembly as in claim 1, further comprising an RFID in electrical communication with the electrical contacts.

8. A water filter assembly as in claim 1, wherein the cylinder is rotatable about a central axis that intersects the pair of arms.

9. A water filter assembly as in claim 8, wherein the wire form contacts are both positioned along the same side of the central axis.

10. A water filter assembly as in claim 1, wherein the arms of the mounting bracket define grooves into which the wire form contacts are received.

11. A water filter assembly as in claim 1, wherein each wire form contact comprises:
   a first end having a loop for contact with one of the electric contacts on the housing of the filter cartridge;
   a second end;
   a bend positioned between the first end and the second end; and
   an arm extending between the first end and the bend.

12. A water filter assembly as in claim 11, wherein the first ends of the wire form contacts are positioned adjacent to each other.

13. A water filter assembly, comprising:
   a manifold that defines an inlet for receiving unfiltered water and an outlet for directing filtered water out of the water filter assembly, the manifold defining a port;
   a filter cartridge removably received into the port of the manifold, the filter cartridge comprising a housing and a filtering media positioned therein for filtering a flow of water through the water filter assembly, the filter cartridge rotatable between an installed position and an uninstalled position;
   a plurality of electrical contacts positioned on the housing of the filter cartridge; and
   a plurality of wire form contacts received onto the manifold, wherein the wire form contacts each have a loop along one end that is depressed when the filter cartridge is in the installed position and released when the filter is in the uninstalled position;
   wherein the filter cartridge rotates about a central axis of the water filter assembly between the installed position and the uninstalled position, and wherein the manifold defines a pair of grooves extending in a parallel manner over the manifold on opposing sides of the central axis and configured for receipt of the wire form contacts.

14. A water filter assembly as in claim 13, wherein the manifold further comprises:
   a rotatable cylinder in fluid communication with the inlet and outlet, the rotatable cylinder defining the port; and
   a housing into which the cylinder is received, the cylinder rotatable within the housing between the installed position and the uninstalled position; and
   a mounting bracket having a pair of arms to which the housing is attached, the housing positioned between the pair of arms.

15. A water filter assembly as in claim 14, wherein the cylinder is rotatable about a central axis that intersects the pair of arms.

16. A water filter assembly as in claim 15, wherein the wire form contacts are both positioned along the same side of the central axis.

17. A water filter assembly, comprising:
   a manifold that defines an inlet for receiving unfiltered water and an outlet for directing filtered water out of the water filter assembly, the manifold defining a port, the manifold comprising a rotatable cylinder in fluid communication with the inlet and outlet, the rotatable cylinder defining the port;
   a filter cartridge removably received into the port of the manifold, the filter cartridge comprising a housing and a filtering media positioned therein for filtering a flow of water through the water filter assembly, the filter cartridge rotatable between the installed position and the uninstalled position;
   a plurality of electrical contacts positioned on the housing of the filter cartridge; and
   a plurality of wire form contacts received onto the manifold, the wire form contacts movable between a first position when the filter cartridge is in the uninstalled position and a second position when the filter cartridge is in the installed position, wherein in the first position the wire form contacts are not in contact with the electrical contacts on the housing of the filter cartridge and in the second position the wire form contacts are in contact with the electrical contacts.

18. A water filter assembly as in claim 17, wherein the manifold further comprises:
   a housing into which the rotatable cylinder is received, the cylinder rotatable within the housing between an installed position and an uninstalled position; and
   a mounting bracket having a pair of arms to which the housing is attached, the housing positioned between the pair of arms.

19. A water filter assembly as in claim 18, wherein the filter cartridge rotates about a central axis of the water filter assembly between the installed position and the uninstalled position, and wherein the manifold defines a pair of grooves extending in a parallel manner over the manifold on opposing sides of the central axis and configured for receipt of the wire form contacts.

* * * * *